(12) United States Patent
Mizrahi

(10) Patent No.: US 6,377,392 B1
(45) Date of Patent: Apr. 23, 2002

(54) OPTICAL AMPLIFIER

(75) Inventor: Victor Mizrahi, Columbia, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/258,238

(22) Filed: Feb. 26, 1999

(51) Int. Cl.[7] .................. H01S 3/067; H04J 14/02
(52) U.S. Cl. .............. 359/337.21; 359/160; 359/341.1
(58) Field of Search .................. 359/134, 160, 359/337, 341, 337.21, 341.1

(56) References Cited

U.S. PATENT DOCUMENTS

| | | | |
|---|---|---|---|
| 5,557,442 A | 9/1996 | Huber | 359/179 |
| 5,598,294 A * | 1/1997 | Uno et al. | 359/341 |
| 5,636,054 A * | 6/1997 | Artigaud et al. | 359/341 |
| 5,677,786 A * | 10/1997 | Meli | 359/341 |
| 5,717,795 A | 2/1998 | Sharma et al. | 385/24 |
| 5,757,541 A * | 5/1998 | Fidric | 359/341 |
| 5,764,821 A | 6/1998 | Glance | 385/14 |
| 5,822,113 A * | 10/1998 | Delavaux et al. | 359/341 |
| 5,825,521 A | 10/1998 | Ogawa et al. | 359/161 |
| 5,867,306 A * | 2/1999 | Isshiki | 359/341 |
| 5,933,270 A * | 8/1999 | Toyohara | 359/341 |
| 5,938,309 A | 8/1999 | Taylor | 359/124 |
| 6,021,233 A | 2/2000 | Koehler | 385/24 |
| 6,031,644 A | 2/2000 | Utsumi | 359/110 |
| 6,104,528 A | 8/2000 | Hwang | 359/341 |

FOREIGN PATENT DOCUMENTS

| | | | |
|---|---|---|---|
| DE | 19645542 A1 | 5/1998 | |
| EP | 0844757 | 5/1998 | 10/213 |
| FR | 2764452 | 12/1998 | 10/4 |
| WO | 9808322 | 2/1998 | 10/213 |
| WO | 9842050 | 9/1998 | |
| WO | 9849794 | 11/1998 | 14/2 |

* cited by examiner

Primary Examiner—Nelson Moskowitz
(74) Attorney, Agent, or Firm—David L. Soltz; Michael R. Cammarata (57) ABSTRACT

A WDM ring transmission system is provided whereby each optical signal is first dropped from the ring, supplied to an amplifier, and then input to an optical receiver. Typically, a filtering element is also provided either prior to or after the amplifier. The amplifier increases the power of the transmitted optical signal so that the optical signals can be transmitted over greater distances, and the filtering element minimizes any adjacent channel cross-talk light fed to the receiver. Moreover, since the amplifier only amplifies the dropped channel, excessive noise accumulation due to non-uniform spectral gain can be avoided. In addition, channels can be arbitrarily assigned to add/drop elements along the ring. A simplified amplifier design is further disclosed.

6 Claims, 7 Drawing Sheets

OPTICAL AMPLIFIER

BACKGROUND OF THE INVENTION

The present invention is directed toward a system for monitoring a wavelength division multiplexed (WDM) system having a ring configuration.

Optical communication systems are a substantial and fast growing constituent of communication networks. Currently, many optical communication systems are configured to carry an optical channel of a single wavelength over one or more optical waveguides. To convey information from plural sources, time-division multiplexing (TDM) is frequently employed. In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While capacity can be increased by laying additional fiber, in certain locations, the cost of laying additional fiber is prohibitive. Point-to-point wavelength division multiplexed (WDM) systems have thus been deployed in which a single fiber can carry numerous optical channels or wavelengths, thereby greatly increasing the capacity of the fiber. In metropolitan areas, WDM systems having a ring configuration can be used to provide high capacity data links between several nodes. Such systems typically include a plurality of nodes located along the ring. At least one optical add/drop element, associated with each node, is provided along the ring to permit both addition and extraction of optical signals at a particular wavelength to and from the ring. One of the nodes, referred to as a hub or central office node, has a plurality of associated add/drop elements for transmitting and receiving a corresponding plurality of optical signals at respective wavelengths to/from other nodes along the ring.

Each optical signal in a WDM system is typically at a wavelength within a relatively narrow range about 1550 nm, which is the absorption minimum associated with most silica-based optical fibers. Accordingly, the wavelengths are somewhat narrowly spaced, typically by about 100–200 GHz, but sufficiently far apart to be separated by add/drop elements including dielectric filters. The filters, however, still drop an attenuated portion of optical signals at wavelengths close to the desired wavelength. Typically, provided that the power level of an optical signal at the adjacent wavelength is not significantly more than the power level of the optical signal at the desired wavelength, the filter can output the desired optical signal at a level at least 20 dB greater than the optical signal at the adjacent wavelength power level, thereby permitting accurate detection of the desired optical signal.

The optical signal at the desired wavelength, however, may be transmitted from an emitter located at a node spaced relatively far from the corresponding receiver, while an emitter transmitting an optical signal at a wavelength adjacent the desired wavelength may be spaced relatively close to the receiver sensing the optical signal at the desired wavelength. As a result, the power level of the optical signal at the adjacent wavelength input to the filter at the receiver can be significantly greater than that of the optical signal at the desired wavelength. Thus, both optical signals at the desired and adjacent wavelengths are supplied to the receiver at comparable power levels. Such "adjacent channel cross-talk" prevents accurate detection of the optical signal at the desired wavelength.

In conventional WDM ring systems, adjacent channel cross-talk can be minimized by assigning channels to specific add/drop elements along the ring so that each channel is added and/or dropped at a location spaced from the add/drop of an adjacent channel by a given number of intermediate add/drop elements. As a result, adjacent channel cross-talk light is significantly attenuated by the add/drop elements provided between the add and drop locations of adjacent channels.

This approach, however, may be inconvenient because channels cannot be arbitrarily assigned to add/drop elements around the ring. In addition, if the ring is particularly large, optical amplifiers may be required to amplify the transmitted optical signals. Optical amplifiers, however, amplify all light input to them within a particular range, and thus amplify both signal light and adjacent channel cross-talk light. Accordingly, if the system performance is limited by cross-talk, amplification of all channels equally will not improve performance.

Moreover, channels added at a location near the input to the amplifier are likely to have greater optical power at the output of the amplifier than those added farther away. In which case, the amplifier has non-uniform spectral gain whereby much of the pump power supplied to the amplifier is consumed by the high gain channels instead of the low gain channels. Accordingly, low gain channels suffer excessive noise accumulation after propagating through several amplifiers.

SUMMARY OF THE INVENTION

Consistent with the present invention, a WDM optical communication system is provided, comprising a looped optical communication path carrying a plurality of optical signals, each at a respective one of a plurality of wavelengths, and a plurality of communication nodes coupled to the looped optical communication path. At least one of the plurality of communication nodes comprises an optical add/drop multiplexer having an input port configured to be coupled to the optical communication path for receiving the plurality of optical signals. The communication node also includes an optical amplifier coupled to an output port of the optical add/drop multiplexer. The output port supplies a respective one of the plurality of optical signals to the optical amplifier. An optical receiver is coupled to the optical amplifier for sensing one of the optical signals and generating a corresponding electrical signal in response thereto.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

A WDM ring transmission system is provided whereby each optical signal is first dropped from the ring, supplied to an amplifier, and then input to an optical receiver. Typically, a filtering element is also provided either prior to or after the amplifier. The amplifier permits transmission over greater distances, but since only one channel is amplified, excessive noise accumulation due to non-uniform spectral gain can be avoided. In addition, the filtering element reduces adjacent channel cross-talk so that channels can be arbitrarily assigned to add/drop elements along the ring.

Figure 1:
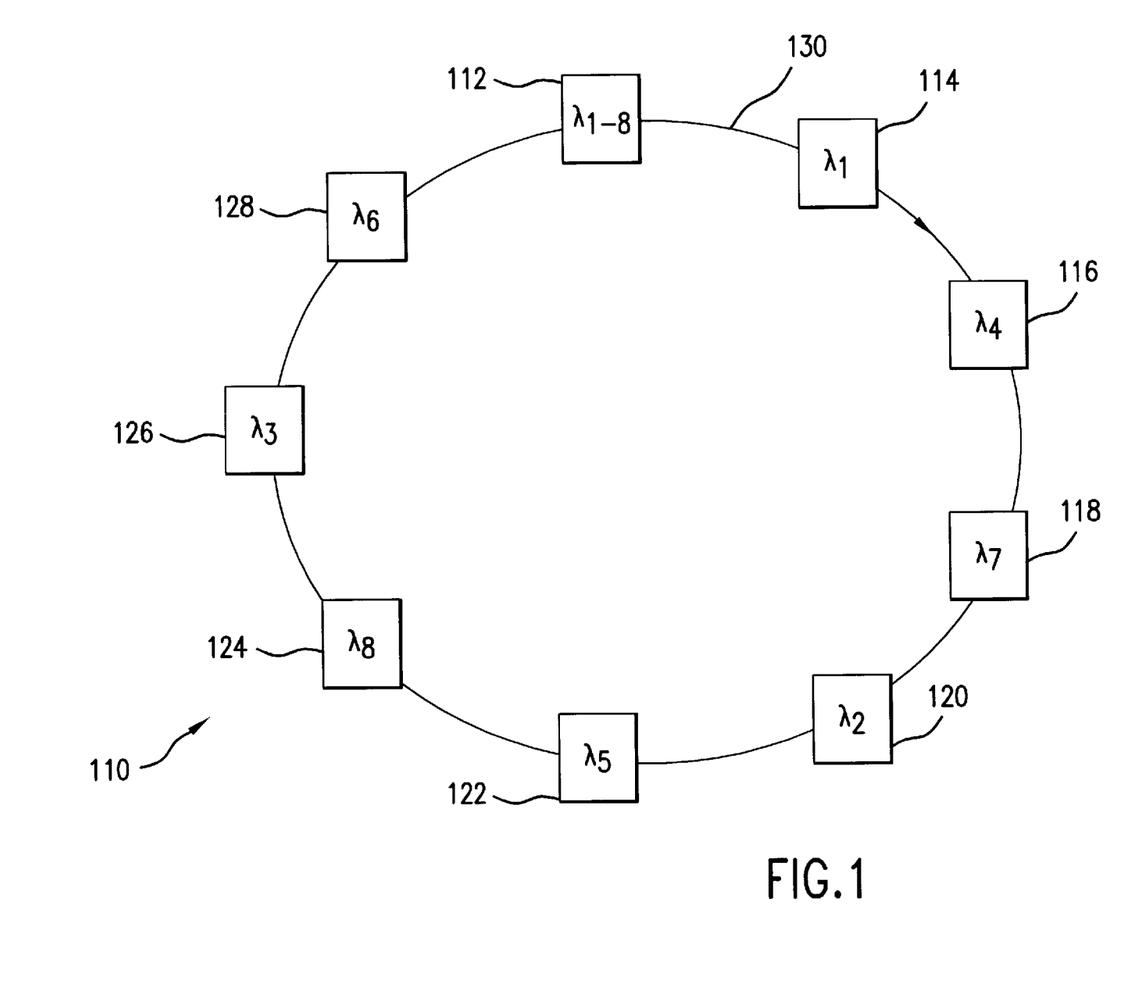
FIG. 1 illustrates a block diagram of a WDM ring system consistent with the present invention.

Turning to the drawings in which like reference characters indicate the same or similar elements in each of the several views, FIG. 1 illustrates a fictional block diagram of a WDM ring system 110 in accordance with the present invention. Typically, WDM ring 110 includes a plurality of nodes 112, 114, 116, 118, 120, 122, 124, 126 and 128 connected along a continuous or looped optical path 130. Typically optical fiber connects each of the node. In addition, no optical amplifiers are provided along optical path 130, and optical signals carried by path 130 are unamplified.

One of the nodes, node 112, for example, can be a central office or hub node that transmits and receives all the optical signals carried by the WDM ring, while the remaining nodes typically include transmitters and receivers associated with a respective one of these optical signals. The present invention, however, is not limited to the WDM ring configuration having a central hub shown in FIG. 1. Rather, the present invention is applicable to WDM ring configurations lacking a central office node, but wherein each node adds or drops one or more of the optical signals at one or more corresponding wavelengths, for example.

Figure 2:
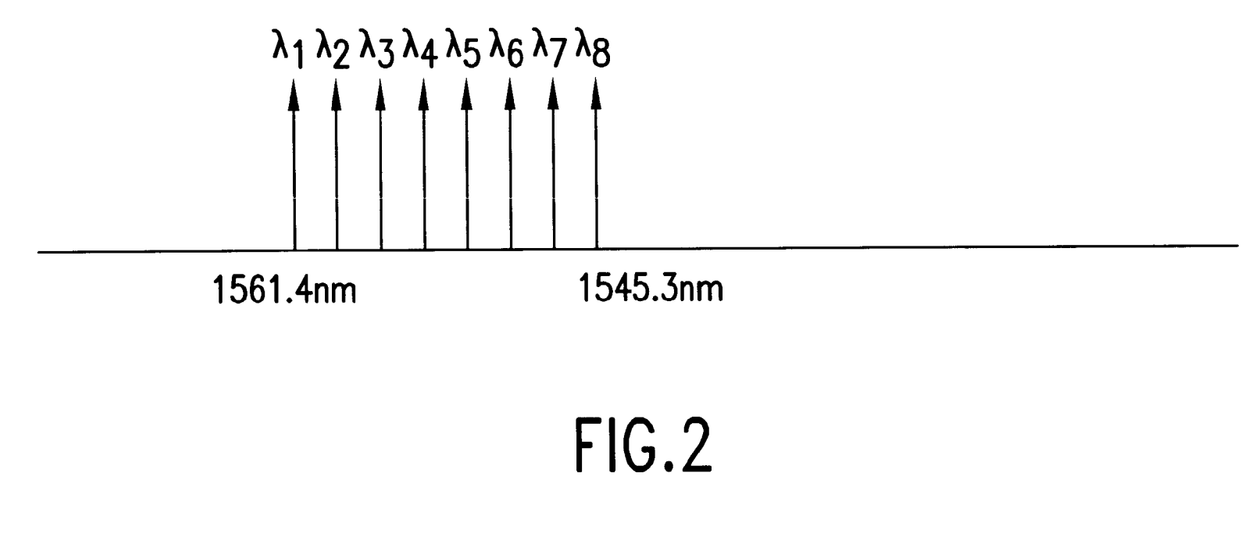
FIG. 2 shows an exemplary channel plan.

Each optical signal is at a respective one of a plurality of wavelengths, which conform to a channel plan, an example of which is shown in FIG. 2. Here, the wavelengths are represented by uniformly spaced arrows, which successively increase from a lowest wavelength value of 1561.4 nm to 1545.3 nm. This channel plan is exemplary, however, and it is understood that any suitable range of wavelengths with any appropriate spacing is within the scope of the invention.

Figure 3:
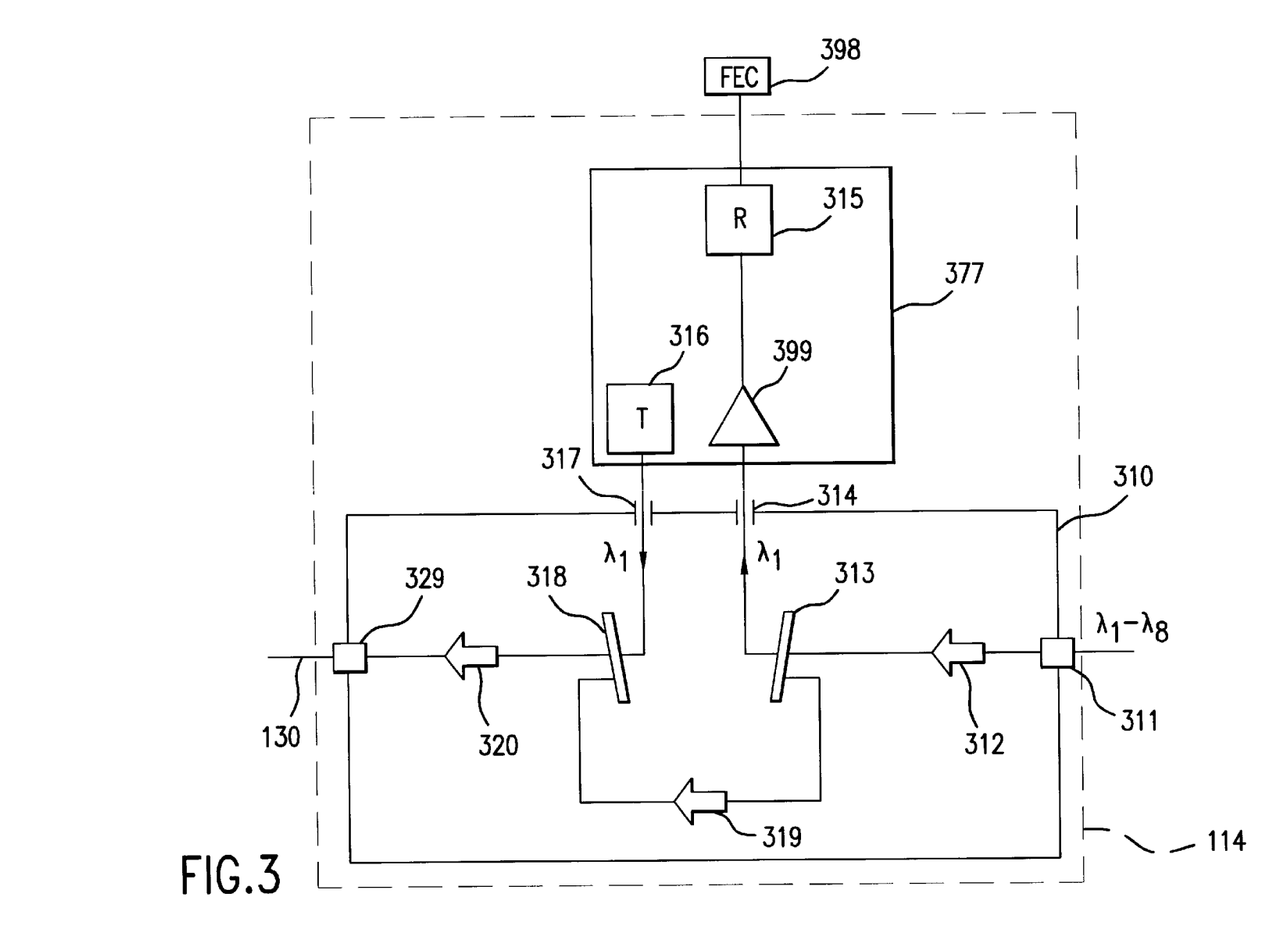
FIG. 3 illustrates an exemplary add/drop element.

FIG. 3 illustrates node 114 in greater detail. Typically, nodes 116, 118, 120, 122, 124, 126, and 128 have a similar construction as node 114. Generally, node 114 includes an optical add/drop element 310 (discussed in greater detail in U.S. patent application Ser. No. 08/956,807, filed Oct. 23, 1997 and incorporated by reference herein), which can insert and/or extract an optical signal at a particular wavelength, but the present invention is not limited to the exemplary add/drop element construction shown in FIG. 3, and other add/drop element configurations supporting a continuous optical path are considered within the scope of the invention. As further shown in FIG. 3, optical signals at wavelengths $\lambda_{1-8}$ output from central office node 112 are fed to optional connector 311 of add/drop element 310 in a direction indicated by arrow 312 to dielectric filter 313. Typically, dielectric filter 313 is configured to drop or select one of the optical signals at a corresponding one of wavelengths $\lambda_{1-8}$, in this example $\lambda_1$, while reflecting the remaining wavelengths, $\lambda_{2-8}$.

After passing through filter 313, the dropped optical signal at wavelength $\lambda_1$ is amplified by optical amplifier 399 through port 314. Optical amplifier 399 can be provided within a housing or module 377 and primarily amplifies the optical signal at wavelength $\lambda_1$, while the remaining wavelengths pass through node 114 and are unaffected by amplifier 399. Accordingly, problems associated with non-uniform spectral gain, as discussed above, are avoided.

The amplified optical signal is then fed to receiver 315 including, for example a conventional photodetector. Receiver 315 can then output the information contained in the optical signal in electrical form from node 114. Alternatively, an optical emitter, including for example a laser, can be appropriately configured within receiver 315 so that optical signals can be output therefrom in response to electrical signals.

Information can also be input to node 114 and transmitted as an optical signal at wavelength $\lambda_1$ by a known transmitter or optical emitter 316, which can comprise either a directly or externally modulated laser, such as an electro-absorption modulated laser commercially available from Lucent® Technologies. Optical emitter 316 may also be provided within module 377, which can also include receiver 315 and can thus be referred to as a transceiver. The optical signal is then input to add/drop element 310 through port 317 to an additional dielectric filter 318. Remaining optical signals at wavelengths $\lambda_{2-8}$ are also supplied in a direction indicated by arrow 319, to filter 318. Filter 318, like filter 313, is configured to pass wavelength $\lambda_1$, for example, and reflect the remaining wavelengths. Accordingly, the optical signal at wavelength $\lambda_1$ is combined with the remaining optical signals at wavelengths $\lambda_{2-8}$, such that each optical signal propagates in a common direction on optical path 130 through connector 329 in a direction indicated by arrow 320.

Emitter 316 can output OC-192 optical signals conforming to a Synchronous Optical Network (SONET) format. Such optical signals are at relatively high data rates, approximately 10 Gbit/second, and are relatively difficult to sense with conventional avalanche photodiodes (APDs), even though these photodetectors provide gain for detecting signals transmitted over large distances. PIN diodes, however, which provide little if any gain, have been shown to successfully detect OC-192 signals over relatively short distances. Since amplifier 399 sufficiently boosts the signal selected by filter 313, PIN diodes can be provided in receiver 315 to accurately detect OC-192 signals transmitted over large distances in accordance with an aspect of the present invention.

Moreover, it is noted that if emitter 316 includes a directly modulated laser, chromatic dispersion can significantly distort optical signals transmitted over distances exceeding 100 km. Accordingly, it may be necessary to perform forward error correction, as described for example, in U.S. patent application Ser. No. 09/244,159 incorporated by reference herein, in order to correct any errors occurring during transmission, and those errors caused by chromatic dispersion in particular.

Connectors 311 and 329, further shown in FIG. 3, are typically selected from the group of commercially available FC/PC, FC/APC, SC/PC, SC/APC, biconic, ST and Diamond E2000 connectors. Alternatively, connectors 311 and 329 can be omitted and optical connections to the add/drop element can be made with fusion splices, for example. It is noted that the exemplary add/drop element shown in FIG. 3 does not include a regenerator having optical to electrical to optical conversion for wavelengths $\lambda_{2-8}$. Accordingly, a continuous optical path typically circulates through WDM ring system 110.

Figure 4:
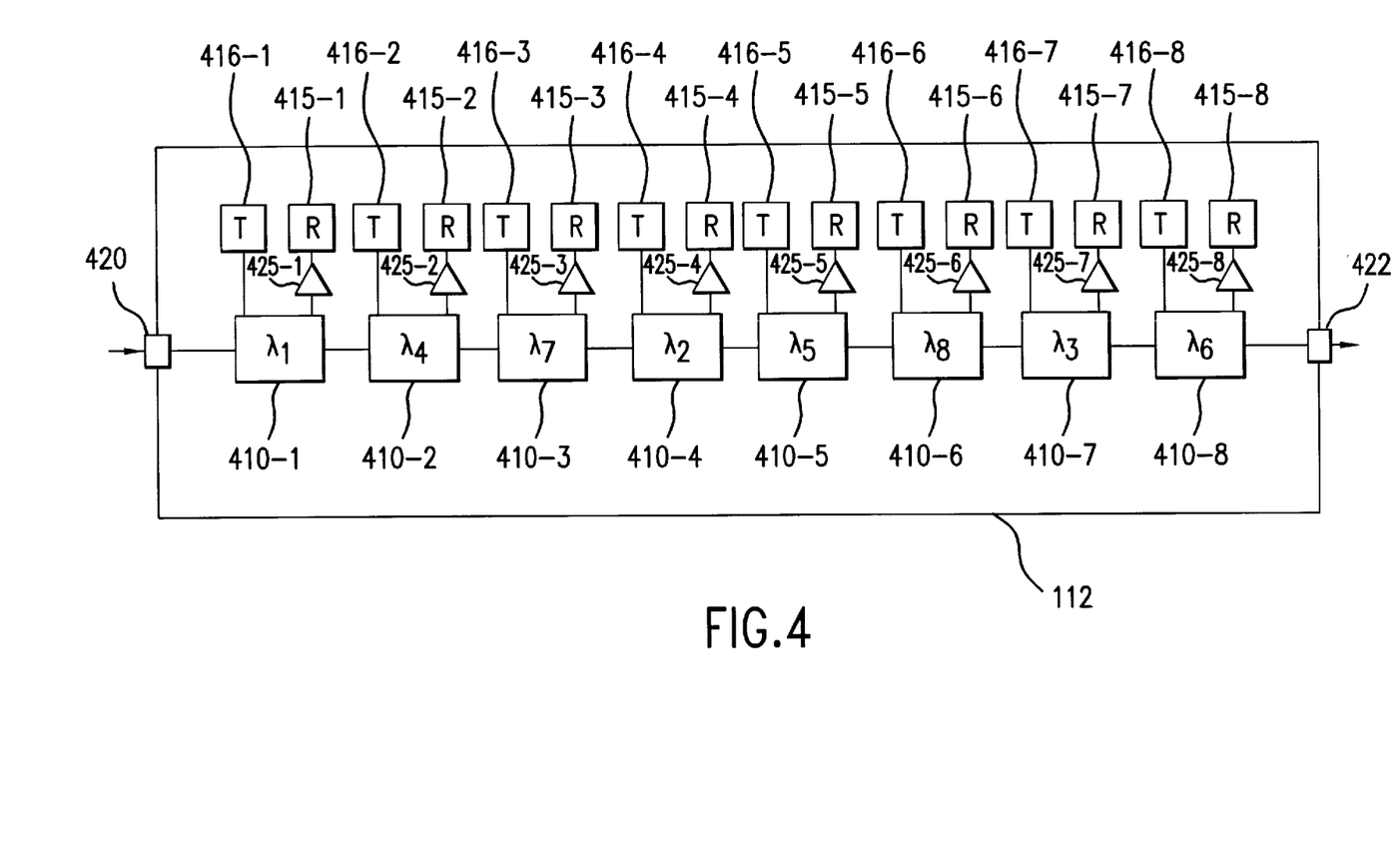
FIG. 4 illustrates a central office node in accordance with the present invention.

Central office node 112 is shown in greater detail in FIG. 4. Central office node 112 includes a plurality of substantially collocated optical add/drop elements 410-1 to 410-8, each of which respectively adding and extracting one of wavelengths $\lambda_{1-8}$. Each of add/drop elements 410-1 to 410-8 has a construction similar to that shown in FIG. 3. In addition, like add/drop element 310 shown in FIG. 3, add/drop elements 410-1 to 410-8 have input ports respectively connected to transmitters 416-1 to 416-8, and output ports respectively connected to a corresponding one of receivers 415-1 to 415-8 via respective optical amplifiers 425-1 to 425-8. As further shown in FIG. 4, optical signals at respective wavelengths $\lambda_{1-8}$ are input to node 112 through an optional connector 420 and output through optional connector 422. Connectors 420 and 422 are typically similar to connectors 311 and 319 discussed above.

Figure 5:
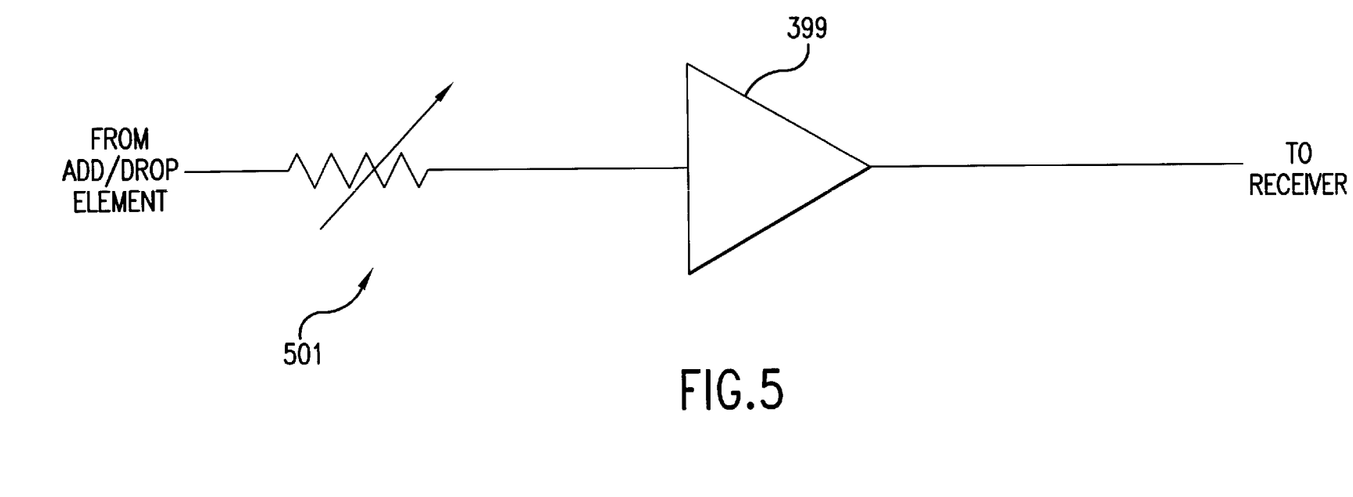
FIG. 5 illustrates an optical amplifier and associated attenuator consistent with the present invention.

It should be noted that the optical channels need not be added and dropped in the sequence shown in FIGS. 1 and 4, but the present invention facilitates an arbitrary assignment of channels to add/drop elements around the ring, as discussed in greater detail below with reference to FIG. 5.

If optical channels are arbitrarily add and/or dropped along WDM ring 110, a particular configuration may require an optical channel to be added at one node and dropped at an adjacent node. In which case, the optical signal may traverse a relatively small portion of WDM ring 110 and any loss due to fiber attenuation will be minimal. The optical signal will thus have a relatively high power, when output from the add/drop element, which exceeds the range of optical intensities, i.e., dynamic range, which can be reliably detected by the receiver. The receiver dynamic range can further be exceeded when the signal is output from an optical amplifier consistent with the present invention. Such dynamic range limitations frequently require a specific allocation of channels to add/drop elements around the ring. Thus, an arbitrary assignment of the channels to the add/drop elements is often precluded.

Consistent with the present invention, however, a known variable or fixed attenuator 501 (shown in FIG. 5) is typically interposed between optical amplifier 399 and the output port of a corresponding add/drop element (e.g., add/drop element 310). Attenuator 501 can be chosen or adjusted to appropriately reduce the power of light input to amplifier 399, so that light output therefrom is within the dynamic range of the receiver. Thus, the receiver can accurately sense optical signal, regardless of the location of the corresponding transmitter, and channels can be arbitrarily assigned to add/drop elements around the ring for this reason as well.

Figure 6:
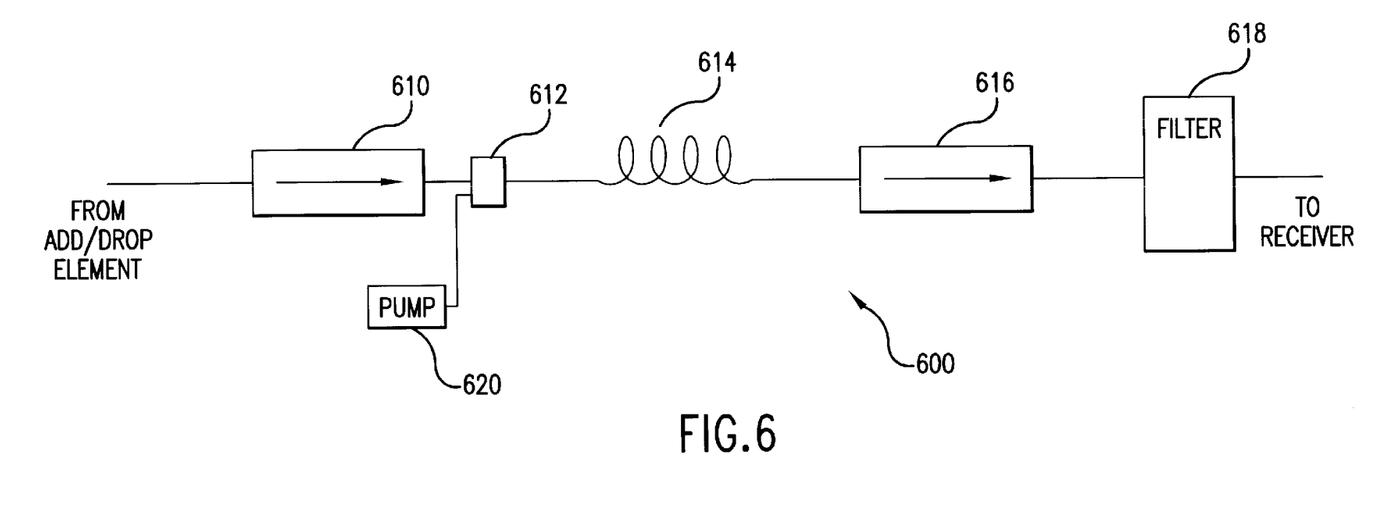
FIG. 6 illustrates an exemplary amplifier configuration consistent with the present invention.

Optical amplifier 399 will be further described with reference to exemplary amplifier configurations 600 and 700 shown in FIGS. 6 and 7, respectively. As shown in FIG. 6, an optical signal output from the add/drop element (e.g., through port 314 of add/drop element 310) passes through an optical isolator provided within amplifier 600. A conventional optical combiner or multiplexer, for example, combines light emitted by a pump laser 620 and signal light output from isolator 610. The combined signal and pump light is next fed to fiber segment 614 doped with a fluorescent material, e.g., erbium. The pump light, typically at a wavelength of 980 nm or 1480 nm, excites the erbium in a known manner to thereby effectuate gain of the signal light, which is typically at a wavelength of about 1550 nm. The amplified signal light next passes through a second isolator 616 and filter 618, including for example a conventional dielectric filter, which filters out amplified stimulated emission (ASE) light emitted from fiber 614 and possibly adjacent channel cross-talk light as well. The amplified light is then detected by the receiver (e.g., receiver 315).

An alternative amplifier configuration will next be described with reference to FIG. 7. Here, amplifier 700 includes a conventional optical circulator 710 that receives an optical signal from the add/drop element through a first port 710-1 and outputs the signal to doped fiber 712, similar to doped fiber 614 described above, through second port 710-2. Pump light is also supplied to doped fiber 614 from pump laser 716, similar to pump laser 620 described above. The pump light, however, is fed to fiber 712 via a filtering element, such as in-fiber Bragg grating 714, which is typically designed to reflect light at the desired signal wavelength, but transmit other wavelengths. Accordingly, signal light output from second port 710-2 is reflected back through fiber 712 by grating 714 to second port 710-2 and experiences gain during each pass through fiber 712. The reflected light is then output from a third port 710-3 and passes through an optional dielectric filter 618 to receiver 315, for example. Filter 618 can be provided to reduce ASE, as noted above, but can be omitted if the amount of ASE is below an acceptable level. In addition to or instead of filter 618, dielectric filter 735 can be provided at the output of pump laser 716. Typically, filter 735 is configured to transmit light at the pump laser wavelength (980 nm or 1480 nm, for example), but substantially reflect light at other wavelengths including ASE and signal light. Accordingly, pump laser 716 is effectively isolated from any ASE or signal light passing through grating 714 which could otherwise adversely affect performance of pump laser 716.

Figure 7:
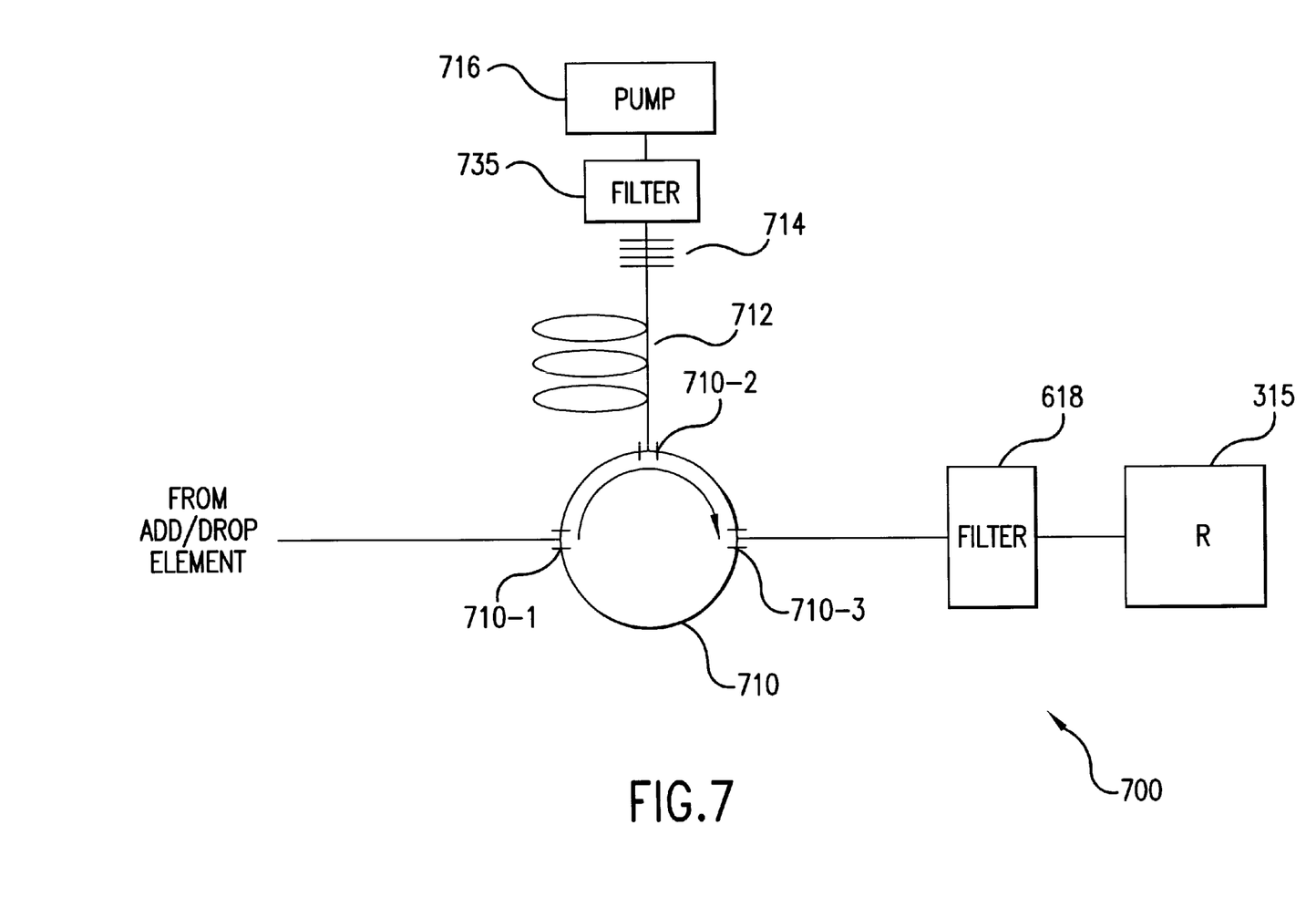
FIG. 7 illustrates an alternative amplifier configuration consistent with the present invention.

In the configurations shown in FIGS. 6 and 7 filters 735 and 618 may have a relatively narrow spectral width or bandwidth, for example about 1 nm. However, if the amplifiers show in FIGS. 6 and 7 are provided as line amplifiers in WDM transmission systems, fiber 712 may not have the same gain for each channel. Thus, filter 618, for example, may be configured to have a relatively broad spectral width to encompass an exemplary group of channels within the range of about 1530 nm to 1565 nm, and may be tailored to selectively attenuate some channel more than others in order that all channels are output from the amplifier with substantially the same amount of gain.

Amplifier 700 shown in FIG. 7 is advantageous because no coupler is required to combine the pump and signal light. Thus, amplifier 700 has a simpler and less expensive design. Moreover, adjacent channel cross talk light passes through grating 714 and is not reflected back through the circulator. Accordingly, receiver 315 detects little, if any, adjacent channel cross talk. Further, amplifier 700 shown in FIG. 7 is relatively compact and can be readily provided within transceiver module 377 shown in FIG. 3.

Further, ASE generated in the amplifier fiber which co-propogates with the signal during the first pass exits the amplifier at grating 714, and hence is not further amplified during the second pass of the signal light.

While the foregoing invention has been described in terms of the embodiments discussed above, numerous variations are possible. For example, filter 618 can be provided at the input to port 710-1 to block any adjacent channel cross-talk instead of at the output of port 710-3. Accordingly, modifications and changes such as those suggested above, but not limited thereto, are considered to be within the scope of the following claims.

What is claimed is:

1. An optical amplifier comprising:
   an optical circulator having first, second and third ports, said first port of said optical transfer element being configured to receive a plurality of optical signals conforming to a channel plan, a first one of said plurality of optical signals having a higher power than a second one of said plurality of optical signals, and said second port of said optical circulator being configured to output said first and second optical signals;

an optical fiber doped with a fluorescent material having first and second ends, said first end of said optical fiber being coupled to said second port of said optical circulator;

an in-fiber Bragg grating coupled to said second port of said optical circulator and being configured to reflect said first one of said plurality of optical signals in a direction back to said second port of said optical circulator while passing said second of said plurality of optical signals;

a dielectric filter coupled to said second port of said optical circulator; and an optical source coupled to said doped fiber via said in-fiber Bragg grating, said optical source supplying light at a pump wavelength to said optical fiber through said in-fiber Bragg grating and said dielectric filter to thereby effectuate amplification of said first optical signal when said first optical signal passes through said optical fiber from said second port of said circulator to said in-fiber Bragg grating and when only said first optical signal is substantially reflected back through said optical fiber by said in-fiber Bragg grating, substantially only said amplified first optical signal being fed through said second port of said optical circulator and being output through said third port of said optical circulator and having reduced adjacent channel crosstalk.

2. An optical amplifier in accordance with claim 1, wherein said dielectric filter is configured to filter amplified stimulated emission (ASE) light emitted by said optical fiber.

3. An optical amplifier in accordance with claim 1, further comprising an optical attenuator coupled to one of said first, second and third ports of said optical circulator.

4. An optical amplifier in accordance with claim 1, wherein said dielectric filter has a spectral width of about 35 nm.

5. An optical amplifier in accordance with claim 1, wherein said dielectric filter has a spectral width of about 1 nm.

6. An optical amplifier in accordance with claim 1, further comprising a further filtering element coupled to said third port of said optical transfer element.

\* \* \* \* \*